United States Patent Office 2,981,640
Patented Apr. 25, 1961

2,981,640
PROCESS OF PREPARING BACTERICIDAL ARTICLE AND THE RESULTING ARTICLE

William H. Hill, Pittsburgh, Pa., assignor to Permachem Corporation, West Palm Beach, Fla.

No Drawing. Filed Oct. 28, 1955, Ser. No. 543,586

9 Claims. (Cl. 117—138.5)

The present invention relates to bactericidal articles and to methods of preparing the same.

Silver compounds are known for their bactericidal properties. Articles of a number of different materials, such as cotton, wool, leather, paper, and rubber, can be treated with silver compounds so that they do not become contaminated with bacteria on exposure to air. Treatment of various cloth articles such as bandages, clothing, and underwear, is particularly advantageous to maintain these articles sterile on exposure to bacteria.

A disadvantage of silver salts as a rule is that they discolor on exposure to light. A white article treated with a silver salt soon becomes discolored and gray, harming its appearance and sales value.

According to the present invention, it has been found that silver thiocyanate, unexpectedly and in contrast to other silver salts, is not photosensitive, so that articles treated with silver thiocyanate possess the bactericidal properties of articles treated with other silver salts and, at the same time, retain their initial color even after prolonged exposure to sunlight.

According to the present invention the article to be rendered bactericidal is treated in aqueous medium to form a precipitate of silver thiocyanate on the article. This may be done generally in either of two ways. According to the first method silver thiocyanate is precipitated in situ on the article. The article to be treated may be wet with an aqueous solution of silver thiocyanate and a second solute such as ammonia or a soluble colorless thiocyanate, which acts as a solubilizing agent to render silver thiocyanate soluble in aqueous medium, and further treated to precipitate silver thiocyanate on the article either as simple silver thiocyanate, AgSCN, or as a complex silver thiocyanate containing a second constituent such as ammonia or a soluble thiocyanate in addition to silver thiocyanate. An alternative procedure is to treat the article with two solutions, one of which contains a soluble silver compound and the other of which contains a soluble thiocyanate. The second method is to apply an aqueous medium containing a binder and a precipitate of silver thiocyanate to the article. Silver thiocyanate for use in this method may be precipitated in any desired manner from aqueous solution, as for example by reaction of a soluble silver salt with a soluble thiocyanate, or by dilution of an aqueous solution of silver thiocyanate and a solubilizing agent such as ammonia or an excess of a soluble thiocyanate. The adhesive or binder is present in the aqueous medium in which the silver thiocyanate is precipitated according to a preferred mode of operation. Any method by which silver thiocyanate precipitated in aqueous solution is applied to an article so as to adhere thereto is applicable to the treatment of articles according to this invention.

Various materials can be treated according to the present invention. Textile fabrics such as cotton, wool, and synthetic materials such as nylon and rayon may all be rendered bactericidal. Paper, leather, rubber, and plastic articles may also be treated according to this invention. Particularly good results are obtained by precipitation of silver thiocyanate in situ on highly absorptive fibrous materials such as cotton, wool, paper, and leather. Either finished articles or unfinished articles such as yarns or bolts of cloth may be treated. The treating solution penetrates into these materials so that the precipitate is deposited to some extent in the interior of the material. These materials may also be treated so as to form a surface coating of silver thiocyanate, by application of previously precipitated silver thiocyanate with a binder, for example. Nonabsorptive materials such as rubber and plastics may also be treated according to this invention, with the formation of a surface precipitate on the article.

The present invention is especially useful in the treatment of cloth articles which are subject to contamination by bacteria. Bandages, which must be kept sterile but which become contaminated on exposure to air, may be treated according to this invention so that they remain uncontaminated by bacteria when exposed to air. Other cloth articles such as bedding, mattress ticking, underwear, stockings, and towels, may be treated so that they are self-sterilizing.

A preferred solution for treatment of articles according to this invention is an aqueous solution of silver thiocyanate and a colorless water-soluble thiocyanate, such as sodium, ammonium, or calcium thiocyanate. Apparently the silver thiocyanate is soluble because of the formation of a complex ion of silver and thiocyanate. The soluble thiocyanate is present in excess, so that the solution contains free thiocyanate (SCN—) ions. The ratio of soluble thiocyanate to silver thiocyanate necessary to keep the latter in solution varies widely with the concentration of the former, and is greater in more dilute solutions. For example, a solution containing 225 grams (2.96 moles) of ammonium thiocyanate per liter has been observed to dissolve 138 grams per liter or 0.83 mole per liter of silver thiocyanate, which corresponds to a ratio of 3.57 moles of ammonium thiocyanate per mole of silver thiocyanate. A solution containing only 40 grams per liter of ammonium thiocyanate, on the other hand, dissolves only about one mole of silver thiocyanate per 100 moles of ammonium thiocyanate.

The solutions described in the preceding paragraph can be applied to a cloth or other article by any method which will wet the article. For example, the cloth or article to be treated may be immersed in a solution of silver thiocyanate and an excess of a soluble thiocyanate. Alternatively, the solution may be sprayed onto the cloth or article. Other methods of application may also be used.

The temperature of the solution of the complex silver thiocyanate is immaterial, any temperature from below room temperature to substantially elevated temperature being satisfactory. The process can be carried out easily by applying the solution at room temperature.

After the cloth or article has been treated with a thiocyanate solution containing dissolved silver thiocyanate, as described above, it is then treated so as to precipitate silver thiocyanate. This is done by reducing the concentration of thiocyanate ions in the solution in contact with the article, either by dilution with water or by chemical reaction of the excess thiocyanate, or by any other suitable means which does not result in discoloration. Various procedures may be used to precipitate silver thiocyanate. For example, a cloth or other article which has been wet with the solution by immersion in a tank or pan of the solution is removed from the tank and is then immersed in a second tank containing water or a precipitant which reacts with excess thiocyanate. Alternatively, the article may be sprayed with water or a precipitant. The same procedures may be used on articles which have been treated by spraying with ammonium silver thiocyanate in the first step.

Silver thiocyanate can also be precipitated on an article by evaporation of the water of solution. This precipitates both the silver thiocyanate and the alkali metal or ammonium thiocyanate in the solution, possibly as a complex salt. The precipitate thus formed is more soluble in water and therefore less desirable than silver thiocyanate.

An advantage of impregnation of an article with a solution of silver thiocyanate in soluble aqueous thiocyanate is that an excess of thiocyanate which is necessarily present in this complex solution appears to increase the light stability of the precipitated silver thiocyanate. The solution preferably is neutral or slightly acid, and should not have a pH in excess of about 10, as silver thiocyanate and its complex salts are desulfurized under strongly alkaline conditions, with the precipitation of black silver sulfide.

Treatment with silver thiocyanate dissolved in excess soluble thiocyanate is particularly advantageous for cotton cloth and other cellulosic articles and fabrics. Thiocyanate ions cause cellulose to swell, thereby increasing the permeability of the material. Dissolved silver and thiocyanate are taken into the cellulosic fiber structure rather than simply adhering to the surface. When the fiber is thereafter treated to precipitate silver thiocyanate, the precipitate forms within the fiber structure, as well as on the surface, thus increasing the adherence and permanence of the precipitate.

An article may be rendered both bactericidal and fungicidal by treating the article with the solution described above and reacting the excess thiocyanate with a copper compound under reducing conditions so as to form a coprecipitate of silver thiocyanate and cuprous thiocyanate. The cuprous thiocyanate is fungicidal, so that the cloth or article remains sterile from contamination by either bacteria or fungi. One procedure for coprecipitating silver and cuprous thiocyanates is to wet the cloth with a solution of silver thiocyanate in a soluble thiocyanate such as an alkali metal or ammonium thiocyanate, and then contact the wet cloth with a solution of copper sulfate and sodium metabisulfite, $Na_2S_2O_5$. This procedure may be carried out at room temperature, but is preferably carried out at an elevated temperature, about 55° C., to facilitate reduction of the copper ion to the cuprous state. Alternatively, sulfur dioxide may be contacted with the cloth or article simultaneously with copper sulfate. Other nondiscoloring reducing agents may also be used.

A solution of silver thiocyanate dissolved in excess equeous ammonia may also be used to impregnate a cloth or article for the purpose of forming a silver thiocyanate precipitate thereon. This solution may be applied by immersion of the cloth or article or by spraying in the same manner as previously described. The amount of ammonia in the solution is preferably just sufficient to give a clear solution. It has been found that a solution of one volume of 29 percent aqueous ammonia diluted with four volumes of water will dissolve approximately three grams per liter of silver thiocyanate. As the concentration of ammonia is decreased, the solubility of silver thiocyanate in the solution decreases.

To precipitate silver thiocyanate on a cloth or other article, the article, after a solution of silver thiocyanate in aqueous ammonia has been applied, is treated by any desired means, as for example water or dilute acid, which will reduce the concentration of ammonia in the solution clinging to the cloth. This causes precipitation of silver thiocyanate. In the case of absorbent materials such as cellulosic materials and wool there is some impregnation of the material by the precipitate. In other cases, as for example synthetic fibers, such as nylon, and nonporous articles of rubber and plastic which may be treated according to this invention, the precipitate of silver thiocyanate is primarily and frequently exclusively on the surfaces of the article.

While dilution with water and treatment with dilute acid have been given as examples of methods for precipitating the silver thiocyanate, it is understood that other procedures which reduce the concentration of ammonia without discoloring the cloth may also be used. For example, the cloth may be simply dried, causing the ammonia to be volatilized. Alternatively, the cloth may be treated with formaldehyde vapor, which reacts with the ammonia to form hexamethylenetetramine. Various procedures for reducing the ammonia concentration in the solution clinging to the article and thereby precipitating silver thiocyanate will be apparent.

In preparing a solution of silver thiocyanate dissolved in either an aqueous solution of a water-soluble thiocyanate or aqueous ammonia for use according to this invention, the silver thiocyanate may be precipitated in aqueous solution and then redissolved by the addition of a water-soluble thiocyanate or ammonia. The precipitation is carried out by any desired procedure, generally by reaction of a soluble silver salt such as silver nitrate with a soluble thiocyanate such as ammonium thiocyanate. Drying of the preciptiate should be avoided as this impairs its light stability. The treating solution may be prepared without precipitating silver thiocyanate at all. A water-soluble silver salt and a large excess of a water-soluble thiocyanate may be mixed to prepare a solution of silver thiocyanate dissolved in excess thiocyanate. To prepare a solution of silver thiocyanate dissolved in ammonia, a water-soluble silver salt, an approximately equimolecular quantity or a slight excess of a water-soluble thiocyanate, and a large excess of ammonia are mixed.

Two-bath processes may be used in lieu of the one-bath processes described above to precipitate silver thiocyanate. For example, the article to be treated may be wet first with a solution of a soluble thiocyanate, such as ammonium, sodium, potassium or calcium thiocyanate, and thereafter a soluble silver salt, such as silver nitrate applied to precipitate silver thiocyanate on the article. The order of solutions may be reversed so that the silver salt is first. The solutions may be applied in any convenient manner, for example, by immersion of the article to be treated successively in the two solutions, or by spraying successively with the two solutions. The presence of an excess of thiocyanate has been found to improve the light stability of the precipitate.

The penetration of the treating solution into absorbent materials can be increased by alternate application of vacuum and pressure to the cloth while it is immersed in the solution. Any treating solution from which silver thiocyanate can be precipitated according to this invention may be used. The material is immersed in the treating solution in a vessel connected to a source of suction. Suction is applied to remove air entrapped in the fibers of the material. The suction is released and the vessel is then subjected to a higher pressure, either atmospheric or superatmospheric. This causes solution to penetrate into the spaces in the fibers previously occupied by air. For best results the process is repeated several times. The process can be applied either to one-bath or two-bath treating solutions. In the latter case vacuum and pressure are alternately applied to each solution while the material is immersed therein.

Silver thiocyanate which has been precipitated previously may be applied to a cloth or other article along with an adhesive or binder. Any of the methods described above may be used to precipitate the silver thiocyanate. The silver thiocyanate is preferably precipitated in aqueous medium and applied to a cloth or other article without drying between the two steps, as silver thiocyanate which has been dried prior to application to the article appears to have poorer light stability than silver thiocyanate which has not been dried. A preferred mode of applying the silver thiocyanate is as a solid suspended in aqueous medium which contains an emulsion of the binder. The binder must be compatible with silver thiocyanate. Various synthetic resins, such as polyvinyl acetate, are suitable. The concentration of silver thiocyanate in the aqueous suspension may be as low as 500 to 1000 parts per million, or may be greater as desired. The concentration of the binder is preferably about 1 to 2 percent by weight of the aqueous medium.

Cloths and other articles treated according to the present invention are bactericidally active and retain their original colors even after prolonged exposure to sunlight. The bactericidal effectiveness is demonstrated herein by tests with *Micrococcus pyogenes*, variety *aureus, Escherichia coli*, and *Bacillus subtilis*. These organisms were chosen as representative bacteria for test purposes. Cloths and other articles treated according to this invention are toxic to most bacteria and have been observed to kill a large number of different types of bacteria. Silver thiocyanate has little inhibitory effect on the growth of fungi, and this is shown herein by tests with *Trichophyton gypseum*.

The following examples illustrate specific procedures according to this invention for treating materials and testing their microbicidal activity. Uniform methods, which are described in the paragraphs which follow, were used to prepare cultures of the test organisms and to make the tests. These testing procedures are especially adapted to tests on insoluble microbicidal agents such as silver thiocyanate in this invention.

A nutrient broth for *M. pyogenes* was prepared consisting of 5 grams of dehydrated beef extract, 10 grams of dehydrated peptone, 5 grams of sodium chloride, and 1000 milliliters of distilled water. This broth was boiled for 30 minutes, adjusted to pH 6.8 with 1 N NaOH, boiled an additional 10 minutes, and diluted to its original volume of distilled water.

A stock culture medium for *M. pyogenes* was prepared by adding 1.5 percent by weight of bacto-agar, based on the weight of the broth, to the broth, adjusting the pH to 7.4, and autoclaving at 15 p.s.i. pressure and 121° C. for 20 minutes.

One and one-half grams of a commercially prepared dehydrated nutrient broth consisting of beef extract and peptone in the weight ratio of 3 to 5 were dissolved in 1000 milliliters of water to form the nutrient broths for incubating the test organisms *E. coli* and *B. subtilis*. Stock culture media for these organisms were prepared by mixing 1.5 percent of the dehydrated nutrient broth with 1.5 percent of nutrient agar and autoclaving at 15 pounds pressure and 121° C. for 20 minutes.

Cultures of *M. pyogenes, E. coli*, and *B. subtilis* were grown in their respective stock culture media and transferred to their respective nutrient broths for incubation prior to use in testing. In each case a loopful of the culture was transferred from the stock culture medium to a 10 milliliter portion of nutrient broth, incubated for 24 hours at 37° C., and a loopful transferred from the first to a second 10 milliliters portion of nutrient broth. The culture was incubated in this manner in three successive broths, at which time it was ready for use as an inoculum. A portion of the inoculum was diluted to 100 times the original volume, and 0.1 milliliter samples of the diluted inoculum streaked over the surfaces of solidified agar on plates with bent glass rods. At least four plates, one of which served as a control, were inoculated with each organism.

A stock culture medium for *T. gypseum* was prepared by autoclaving Sabouraud's dextrose agar at 15 pounds pressure and 120° C. for 15 minutes. A test culture was prepared by transferring samples of the organism from the stock culture to agar slants and incubating for ten days at 26° to 30° C. The growth was scraped from the agar and added to 10 milliliters of 1 N NaCl. The suspension was shaken for at least an hour to release the spores, and filtered through sterile gauze and diluted to 10 volumes for final inoculatiton. A 1-milliliter portion of this suspension was then distributed over an area of two square inches on a plate of sterile Sabouraud's dextrose agar by means of a wide-mouth pipette. The plates were then incubated for five to seven days at 26° to 30° C. Proper incubation of the control samples is indicated by a uniform growth of *T. gypseum* at the end of the incubation period.

Toxicity of cloth treated according to this invention against each one of the test organisms was determined by cutting test disks of cloth 15 millimeters in diameter and placing the test disks on agar plates immediately after they have been inoculated with the respective test organisms. Effectiveness is indicated either by the presence of a sterile zone on the agar plate in the area surrounding the disk of treated cloth, or by the lack of overgrowth of organism on the cloth after incubation for seven days. Results showing the toxicity of various samples of cloth treated according to the present invention toward each individual organism are given in the examples which follow.

*Example 1*

Silver thiocyanate was precipitated by addition of silver nitrate solution to a large excess of ammonium thiocyanate in aqueous solution nutil a white precipitate was formed and did not dissolve. Then just enough ammonium thiocyanate was added to dissolve the precipitate. A clear solution was obtained. The solution had a volume of 215 milliliters and contained 29.58 grams of AgSCN and 48.4 grams of $NH_4SCN$, which is a ratio of 3.57 moles of $NH_4SCN$ per mole of AgSCN.

To form a treating solution, 33.1 milliliters of this solution, which was a volume sufficient to contain 3.0 grams of silver ions, was diluted with distilled water, and enough additional ammonium thiocyanate (44.6 grams) was added as a solid to give a clear solution having a volume of 1,000 milliliters. A volume of 966 milliliters of distilled water was required. The volume of the final bath was 1,000 milliliters, and the composition was 4.55 grams of silver thiocyanate, equivalent to 3.0 grams of silver, and 52 grams of ammonium thiocyanate.

Two samples of white cotton cloth were treated as follows:

The first cloth, having a dry weight of 33.8 grams, was immersed in the treating solution for 0.5 minute. The wet cloth weighed 68.8 grams, representing a liquid pickup of 35.0 grams or 103.5 percent of the weight of the cloth.

A second cloth sample weighing 37.7 grams was immersed in the treating solution for 5 minutes. The wet cloth weighed 77.1 grams, representing a liquid pickup of 39.4 grams or 104.5 percent of the weight of the cloth.

Neither cloth exhibited any photosensitivity on exposure to sunlight.

Test disks 15 millimeters in diameter were cut from the dried treated cloths and placed on sterile inoculated agar plates. The plates were then incubated with test organisms of *Micrococcus pyogenes*, variety *aureus, Escherichia coli, Bacillus subtilis*, and *Trichophyton gypseum*, according to the uniform testing procedure described above. The degree of bactericidal effectiveness is indicated by the diameter of the steile zone surrounding the cloth on the agar plate. Test results of the two cloths showed sterile zones of the following diameters in millimeters:

| Organism | Diameter, mm. | |
|---|---|---|
| | Cloth 1 | Cloth 2 |
| M. pyogenes | 31.0 | 30.7 |
| E. coli | 28.5 | 28.5 |
| B. subtilis | 26.8 | 26.5 |
| T. gypseum | 1 0 | slight |

[1] No overgrowth.

The sizable sterile zones surrounding the test disks on the agar plates inoculated with *M. pyogenes, E. coli,* and *B. subtilis* indicate bactericidal activity. Growth of fungi is inhibited by treatment according to the present invention although effectiveness against fungi is much less than against bacteria. The absence of any sterile zone in the vicinity of cloth 1 and the presence of only a small sterile zone in the vicinity of cloth 2 indicates that silver thiocyanate does not kill fungi to an appreciable extent, but the absence of any overgrowth on cloth 1 after incubation for seven days shows that silver thiocyanate does inhibit the growth of fungi.

To indicate the degree of penetration of silver thiocyanate into the fibers, samples of each of the treated cloths were treated with 25 percent aqueous solution of sodium hydroxide to convert the silver present into the dark-colored silver oxide. Microscopic examination of cloth 1 showed little swelling of the fibers, the hollow interior spaces of the fibers were plainly visible, and the cell walls were brilliant red with some variation from fiber to fiber. The fibers of cloth 2 were darker than those of cloth 1, and there was little variation in color among the fibers. These results indicate that there was substantial penetration of solution into the fibers, with the result that the precipitate of silver thiocyanate was formed to a large extent within the fiber structure rather than on the fiber surfaces.

*Example II*

To 50 milliliters of an aqueous solution containing 50 milliliters per liter of 28 percent ammonium hydroxide and 1.452 grams of 8-hydroxyquinoline per liter were added 8 milliliters of an aqueous solution containing 500 grams per liter of ammonium thiocyanate and 17 milliliters of a 1 percent aqueous solution of silver nitrate. This corresponds to 4 grams of ammonium thiocyanate and 0.17 gram of silver nitrate. The ammoniacal solution darkened considerably on the addition of ammonium thiocyanate. No precipitate was formed, even after the addition of silver nitrate. The solution was diluted with distilled water to 100 milliliters.

The solution was placed in a 300-milliliter suction flask. A piece of cheese cloth was immersed in the solution. The wide opening of the flask was closed with a rubber stopper and suction was applied to the side opening. Heavy bubbling was observed. When the bubbling had substantially ceased, the vacuum was removed and the flask opened to atmospheric pressure. The alternate application of vacuum and atmospheric pressure was repeated three times. The cloth was then removed from the suction flask, wrung out by hand, and dipped into a solution containing 2.5 grams of copper sulfate ($CuSO_4 \cdot 5H_2O$), and 1.9 grams of sodium metabisulfite ($Na_2S_2O_5$), in 1 liter of water. This was carried out at room temperature. A clean white precipitate was observed in the solution, and the cloth assumed a slightly yellow color. At no time was a black precipitate which would indicate the formation of cupric thiocyanate observed. The cloth was dried on a watch glass at room temperature. It was faintly cream colored when dried. On exposure to sunlight the cloth grayed somewhat. It is believed that a coprecipitate of cuprous thiocyanate and silver thiocyanate was formed on the cloth. Precipitates of the cuprous and silver salts of 8-hydroxyquinoline were probably also present on the cloth.

Microbiological testing according to the uniform procedure described above gave the following results. Diameters refer to the diameter of the sterile zone surrounding the test disk.

| Organism: | Diameter, mm. |
|---|---|
| *M. pyogenes* | 24.5 / 22.0 |
| *E. coli* | 22.5 / 22.0 |
| *B. subtilis* | 24.5 / 20.5 |
| *T. gypseum* | (¹0) |

¹ No overgrowth.

These cloths killed bacteria and inhibited the growth of fungi, similarly to the cloths described in Example I. Two samples for each species of bacteria were used.

*Example III*

White cotton undershirt fabric was immersed for 15 minutes in 100 milliliters of an aqueous solution containing 0.005 mole per liter of silver nitrate, 0.01 mole per liter of ammonium thiocyanate, and 100 milliliters per liter of 28 percent ammonium hydroxide solution. The fabric was removed from the solution, wrung out by hand, and dried at room temperature until only slightly damp. The cloth was then cut into two pieces. The first was dried at room temperature and the second at 48° C. in an oven. Both pieces were washed with water three times. The first cloth was again dried at room temperature and the second at 48° C. Both cloths showed substantially no discoloration on exposure to sunlight. Microbiological testing showed the following results, in which the diameters represent the diameters of the sterile zones in the vicinity of each test disk.

| Organism | Diameter, mm. | |
|---|---|---|
| | Cloth 1 | Cloth 2 |
| *M. pyogenes* | 22.0 / 23.0 | 23.5 / 23.5 |
| *E. coli* | 21.0 / 21.0 | 22.5 / 23.0 |
| *B. subtilis* | 22.0 / 22.5 | 21.5 / 23.0 |
| *T. gypseum* | (¹) | (¹) |

¹ Slight overgrowth.

The results of two test disks of each cloth with each species of bacteria are given. In each case there was a sterile zone of considerable diameter surrounding the test disk, indicating effective bactericidal action. The cloths showed only slight fungicidal activity, as indicated by the fact that there was a slight growth of *T. gypseum* over the edges of the test disks. The overgrowth was confined to the edges of the disks, which indicated that there was some fungicidal activity.

The above example was duplicated except that silver nitrate and ammonium thiocyanate were present in equimolar quantities, both 0.005 mole per liter. A cloth treated in this solution had bactericidal activity but turned slightly yellow on exposure to sunlight. The presence of a stoichiometric excess of thiocyanate as compared to silver is believed to be necessary to prevent discoloration of the fabric on exposure to sunlight.

*Example IV*

Two treating solutions were prepared. The first contained 3.0 grams of silver sulfate in 2000 milliliters of distilled water, and the second contained 25.0 grams of ammonium thiocyanate in 2000 milliliters of distilled water.

A white knit cotton cloth was wet with the silver sulfate solution by passage between a pair of pad rolls wet with the solution. The wet cloth was then passed directly through a second pair of pad rolls wet with the ammonium thiocyanate solution. The cloth was exposed to direct sunlight, and there was no discoloration.

The bactericidal activity of the cloth was determined by the uniform procedure described above with the following results. The numerals refer to the diameter of the sterile zone in millimeters.

| Organism: | Diameter, mm. |
|---|---|
| *M. pyogenes* | 20.5 |
| *E. coli* | 19.8 |
| *B. subtilis* | 20.0 |

It is essential to avoid drying the cloth between treatments with the two solutions. A cloth which was dried after treatment with the silver sulfate solution and then treated with the ammonium thiocyanate solution became slightly gray on exposure to direct sunlight.

*Example V*

An aqueous dispersion containing 470 parts per million of silver thiocyanate (as AgSCN) in suspension and 1 percent by weight of a commercial resin emulsion consisting of about 50 percent of finely divided polyvinyl acetate, a small amount of emulsifying agent, balance water, was prepared. This dispersion was padded on white knit cotton cloth. There was no discoloration of the cloth after exposure to sunlight for 16 hours. The cloth had fair laundering resistance. Tests for bactericidal activity according to the uniform testing procedure described above showed the following results, in which the numbers represent the diameter of the sterile area in millimeters.

| Organism: | Diameter, mm. |
|---|---|
| M. pyogenes | 24.8 |
| E. coli | 24.3 |
| B. subtilis | 23.8 |

Although this invention has been described with reference to specific examples and embodiments thereof, it is to be understood that the scope is to be measured only by the scope of the appended claims.

What is claimed is:

1. The bactericidal article, lastingly lethal to bacteria coming into contact therewith, consisting essentially of an article and a bactericidal amount thereon of a light-stable silver thiocyanate precipitated in situ on the article from an aqueous medium containing a water-soluble thiocyanate, silver cations, and thiocyanate anions.

2. The bactericidal article of claim 1 which is a textile fabric having said silver thiocyanate precipitated in situ on the textile fabric from the aqueous medium containing thiocyanate anions in excess of the silver cations.

3. In a process of preparation of a bactericidal article lastingly lethal to bacteria coming into contact therewith, the steps of: wetting said article with an aqueous solution containing essentially a water-soluble thiocyanate, silver cations, and thiocyanate cations; and precipitating in situ from said aqueous solution a bactericidal amount of a water-insoluble light-stable silver thiocyanate on said article.

4. The process of claim 3 employing a fibrous material as said article.

5. The process of claim 3 employing a textile fabric as said article.

6. The process of claim 3 employing a cellulosic material as said article.

7. The process of claim 3 in which the wetting is by the aqueous solution containing water-soluble thiocyanate in an amount in excess of the amount of silver cations therein.

8. In a process of preparation of a bactericidal article lastingly lethal to bacteria coming into contact therewith, the steps of: wetting said article with a first aqueous solution and wetting the article while wet from the first aqueous solution with a second aqueous solution, one solution containing silver cations and the other solution containing essentially a dissolved, colorless, water-soluble thiocyanate; and precipitating in situ from the wettings with said aqueous solutions of a germicidal amount of a water-insoluble, light-stable silver thiocyanate on the said article.

9. The process of claim 8 employing a textile fabric as said article and in which the wettings are by immersing said fabric in said solutions.

References Cited in the file of this patent

UNITED STATES PATENTS

| 2,086,419 | Hunt et al. | July 6, 1937 |
| 2,689,809 | Fessler | Sept. 21, 1954 |
| 2,713,008 | Schulenberg | July 12, 1955 |
| 2,791,518 | Stokes et al. | May 7, 1957 |

FOREIGN PATENTS

| 443,444 | Great Britain | Feb. 28, 1936 |

OTHER REFERENCES

J. Chem. Soc., 1932, pp. 2404–10.